Figure 3:
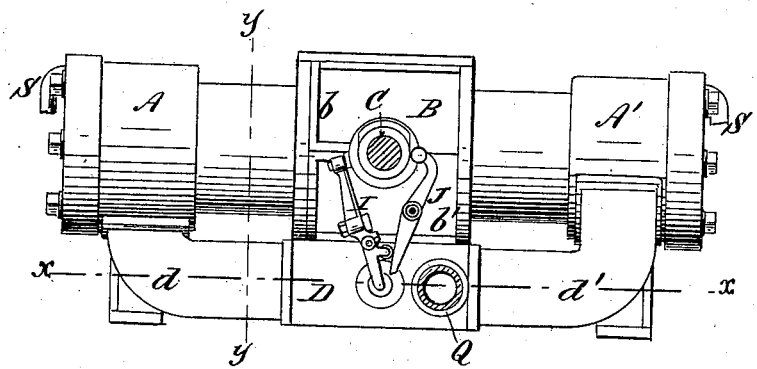

(No Model.)  10 Sheets—Sheet 1.
F. HIRSCH.
GAS ENGINE.
No. 532,555. Patented Jan. 15, 1895.
Fig. 1.
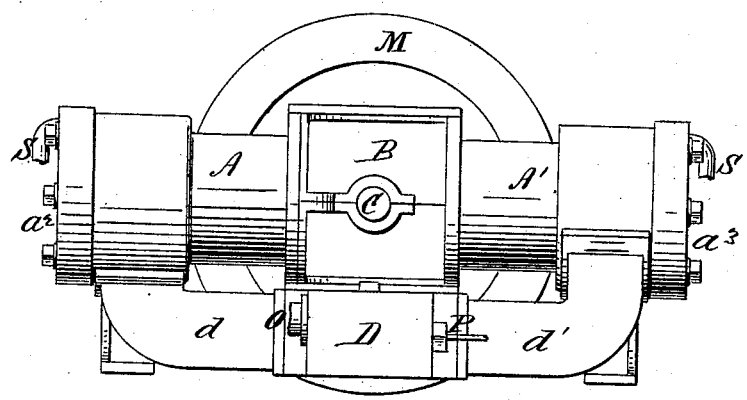
Fig. 2.
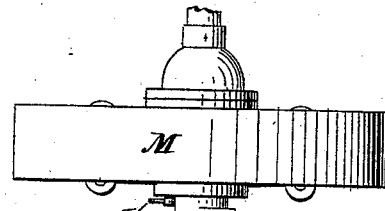
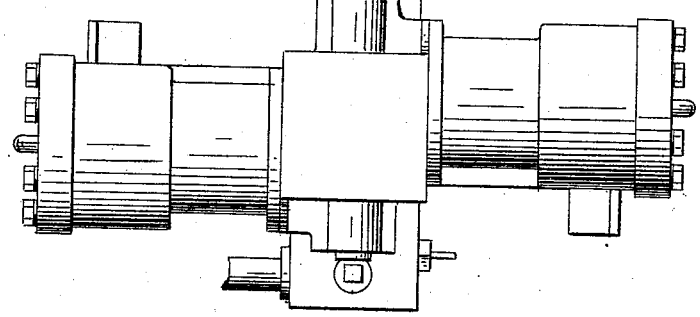
Witnesses:
O. W. Gardner
Daniel Nash
Inventor:
Feodor Hirsch
By his Attorney,
George William Miatt (No Model.)

F. HIRSCH.
GAS ENGINE.

No. 532,555.

10 Sheets—Sheet 2.

Patented Jan. 15, 1895.

Witnesses:
D. W. Gardner
Daniel Nason

Inventor:
Feodor Hirsch
By his Attorney
George William Miatt (No Model.)

F. HIRSCH.
GAS ENGINE.

No. 532,555.

10 Sheets—Sheet 3.

Patented Jan. 15, 1895.

(No Model.)  F. HIRSCH.  10 Sheets—Sheet 4.
GAS ENGINE.
No. 532,555.   Patented Jan. 15, 1895.
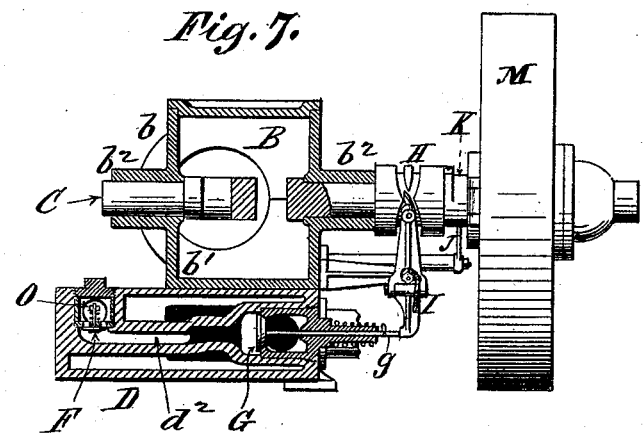
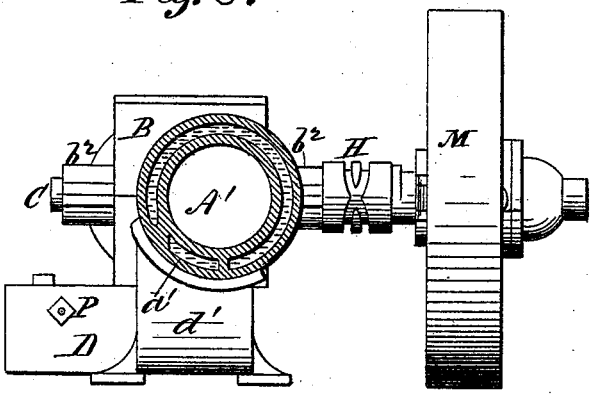
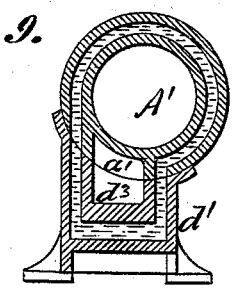
Witnesses:
D. W. Gardner
Daniel Nason
Inventor:
Feodor Hirsch
By his Attorney
George William Miatt (No Model.)

F. HIRSCH.
GAS ENGINE.

No. 532,555.

10 Sheets—Sheet 5.

Patented Jan. 15, 1895.

Witnesses:
D. W. Gardner,
Daniel Han

Inventor:
Feodor Hirsch
By his Attorney
George William Miatt

THE NORRIS PETERS CO., PHOTO-LITHO., WASHINGTON, D. C.

(No Model.)  F. HIRSCH.  10 Sheets—Sheet 6.
GAS ENGINE.

No. 532,555.  Patented Jan. 15, 1895.

Witnesses:
D. W. Gardner.
Daniel Nason

Inventor:
Feodor Hirsch
By his Attorney
George William Miatt (No Model.)

F. HIRSCH.
GAS ENGINE.

No. 532,555.

10 Sheets—Sheet 7.

Patented Jan. 15, 1895.

Witnesses:
D. W. Gardner.
Daniel Mason

Inventor:
Feodor Hirsch,
By his Attorney,
George William Miatt (No Model.)

F. HIRSCH.
GAS ENGINE.

No. 532,555.

10 Sheets—Sheet 8.

Patented Jan. 15, 1895.

Witnesses:
D. W. Gardner.
Dana T. Nason.

Inventor:
Feodor Hirsch
By his Attorney
George William Miatt (No Model.)　　　　　　　　　　　　　　　　　　　　10 Sheets—Sheet 9.
F. HIRSCH.
GAS ENGINE.
No. 532,555.　　　　　　　　　　　　　　Patented Jan. 15, 1895.
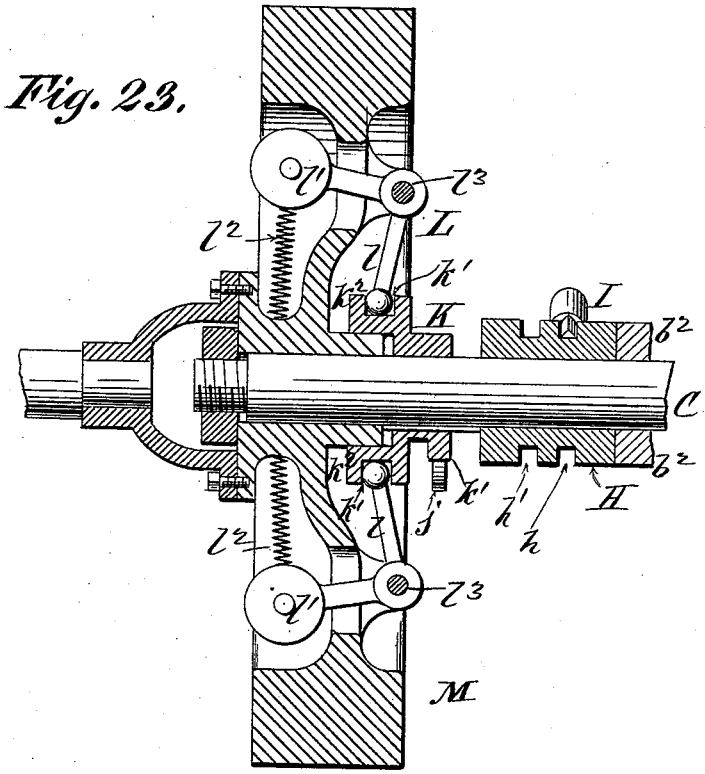

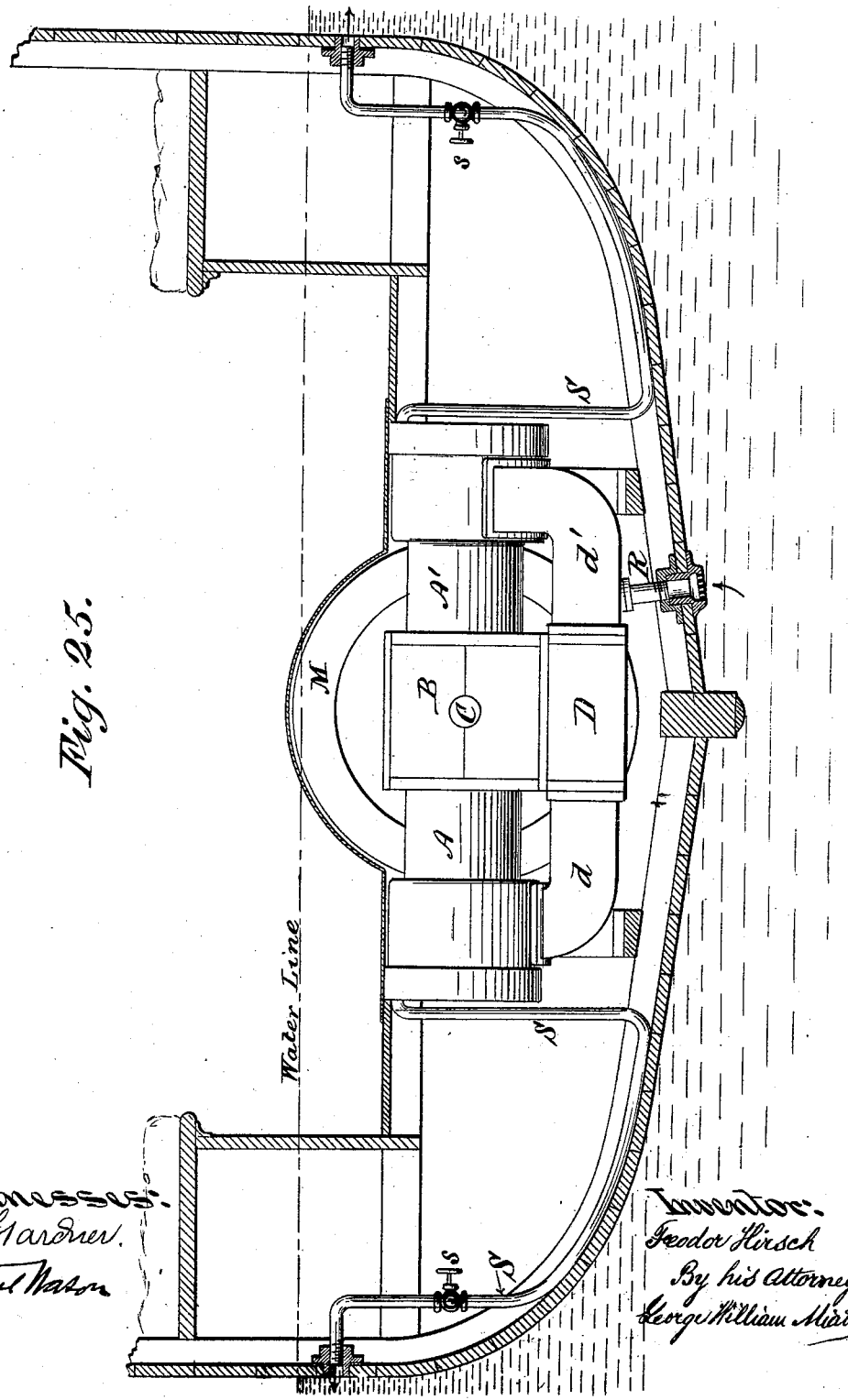

UNITED STATES PATENT OFFICE.

FEODOR HIRSCH, OF STEINWAY, NEW YORK.

GAS-ENGINE.

SPECIFICATION forming part of Letters Patent No. 532,555, dated January 15, 1895.

Application filed March 28, 1894. Serial No. 505,400. (No model.)

*To all whom it may concern:*

Be it known that I, FEODOR HIRSCH, a citizen of the United States, residing in Steinway, in the county of Queens and State of New York, have invented certain new and useful Improvements in Gas-Engines, of which the following is a description sufficient to enable others skilled in the art to which the invention appertains to make and use the same.

My improvements relate to gas engines generally but are especially applicable to marine gas engines, and others where economy of space and concentration of power are desirable.

In my applications, Serial Nos. 484,930 and 502,815, I show opposed power cylinders and pistons connected indirectly with a common crank shaft, the firing of a single central charge by a single igniter driving the pistons apart. The object of my present invention is to apply the same principle of a single central charge and ignition to opposed power cylinders in which the pistons, under the force of explosion, approach each other,—in other words to apply the expansive force of the gases at the outer ends of the cylinders instead of at the inner ends as in my said prior applications. By this means I am enabled to retain all the advantages attained in my prior construction, such as the perfect balancing of the parts, avoidance of jar, strain, &c., and at the same time to simplify and cheapen the construction as a whole. Thus I am enabled to dispense with the links, rock levers, and pitmen required in connecting the outwardly-propelled pistons to the common crank shaft, since I connect my inwardly-impelled pistons directly to the crank-pins on said crank shaft by means of vibratory piston rods; and the cranks and connections with the pistons are all inclosed and isolated centrally within the engine.

An important feature of my invention consists in utilizing the passages leading from the central firing chamber to the inlet ports at the outer ends of the power cylinders as compression chambers, whereby, although the force of the explosion from the single charge of gas spreads instantly to the opposite ends of the motor, the gases act upon the pistons mainly by expansion, and the usual jar and concussion arising from the explosion of the gases are avoided. As a result I not only obtain a more durable and smooth-running motor, but am also enabled to reduce the length of the power cylinders since the compression space heretofore indispensable therein is done away with and the pistons can travel right up to the inlet ports.

Another feature of my present invention is that of dispensing with the intermediate cam shaft and gearing for operating the exhaust valve, &c., since I now arrange the exhaust cam, and governor, &c., directly upon the central power or crank shaft. In this connection my invention includes the special construction and arrangement of mechanism for connecting and disconnecting the cams with the exhaust valve as hereinafter set forth.

I am enabled to construct my engine so low and compact in form, when compared with others of a given power, that when used as a marine engine it can be conveniently placed below the water line of the vessel, and a natural automatic circulation of cooling liquid through its water jackets can be maintained, thereby dispensing with the use of pumps or other means for effecting a forced circulation through the water jacket, as has heretofore been necessary. The engine is so small and low of structure that an effective motor can readily be placed below the floor or deck of an ordinary launch in such manner that it will be practically out of sight as well as out of the way.

Figure 4:
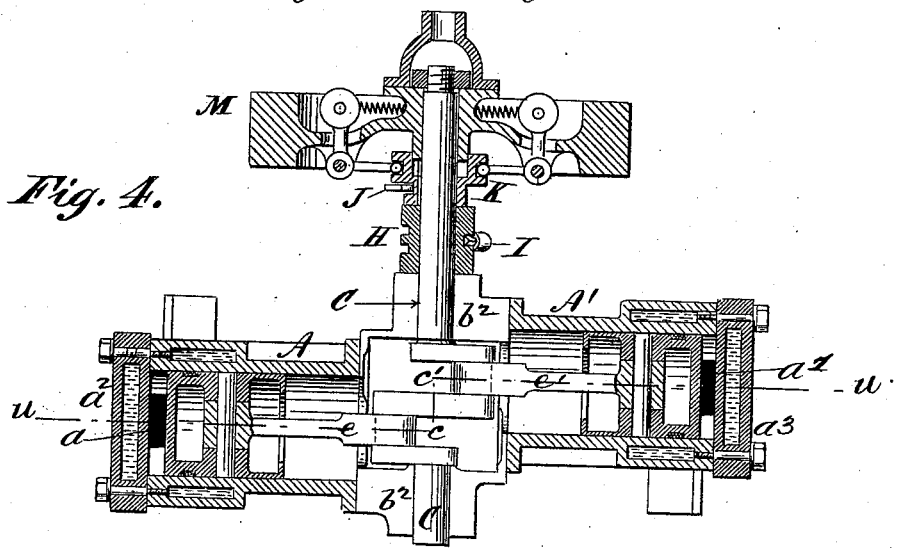
Figure 5:
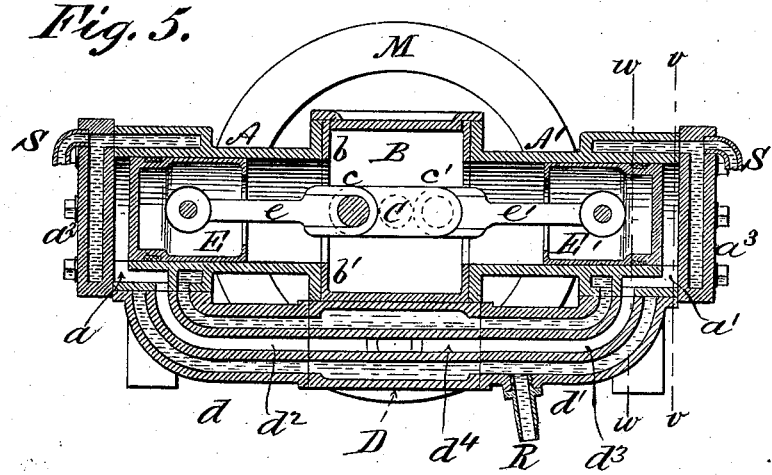
Figure 6:
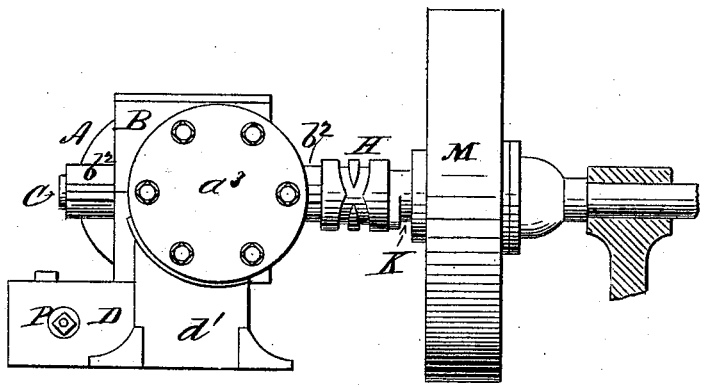
Figure 10:
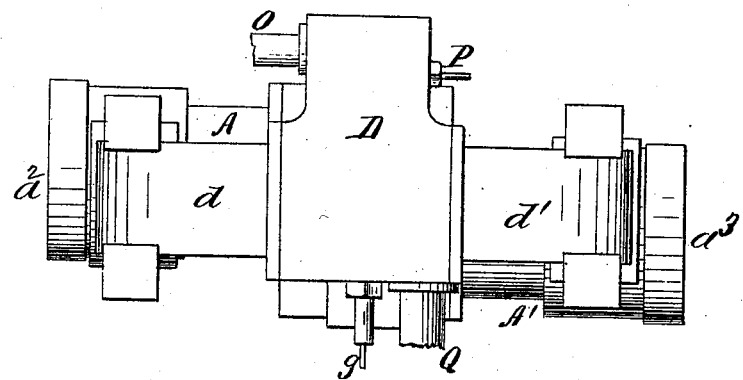
Figure 11:
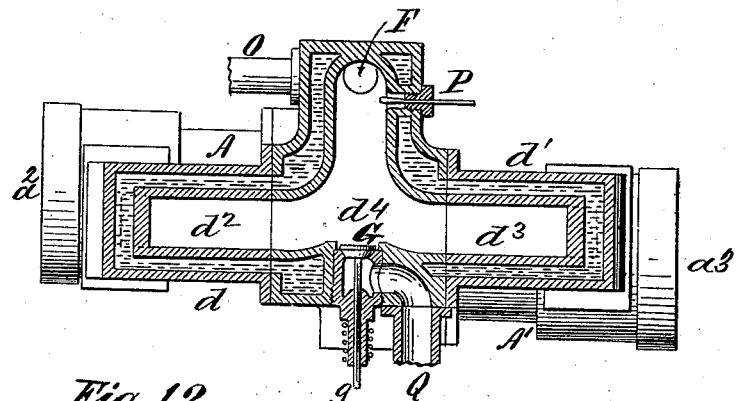
Figure 12:
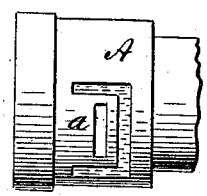
Figure 13:
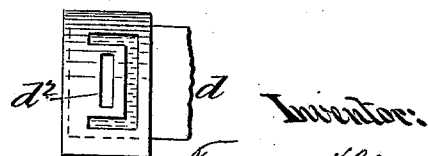
Figure 14:
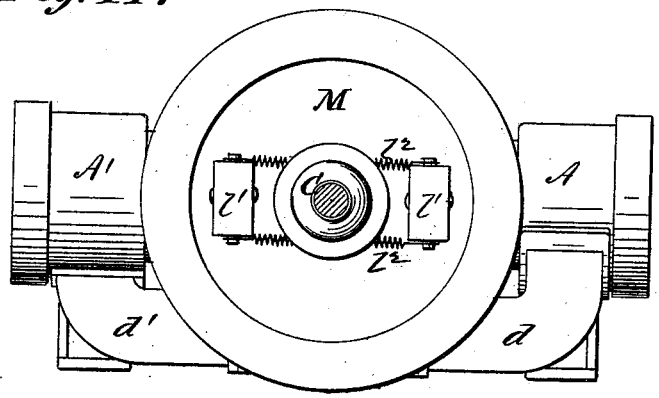
Figure 15:
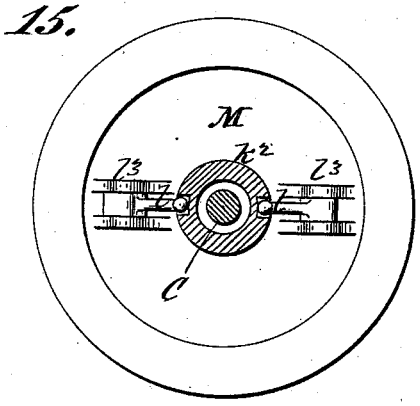
Figure 17:
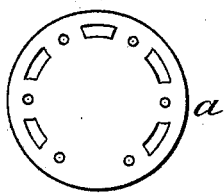
Figure 16:
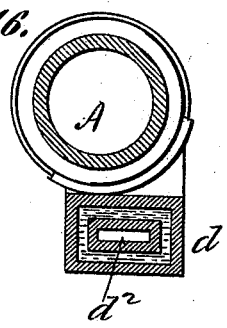
Figure 18:
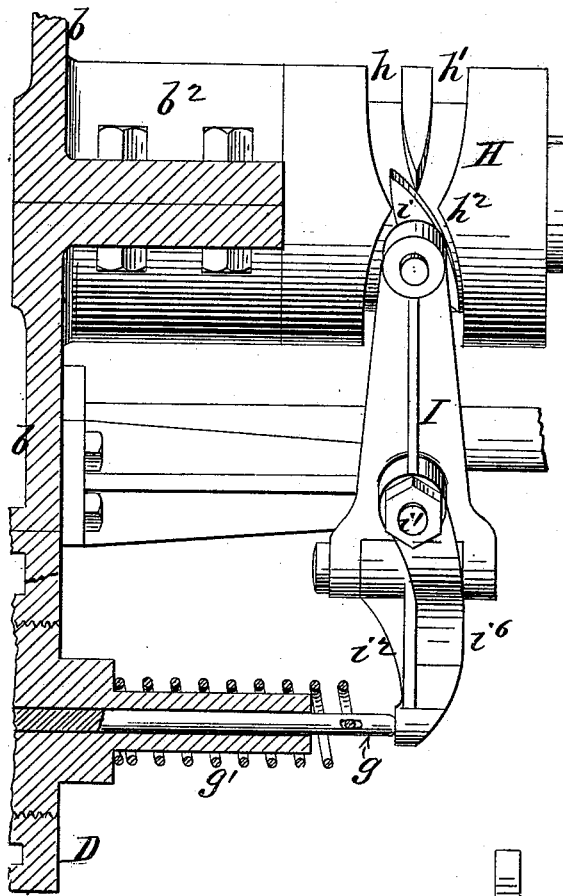
Figure 19:
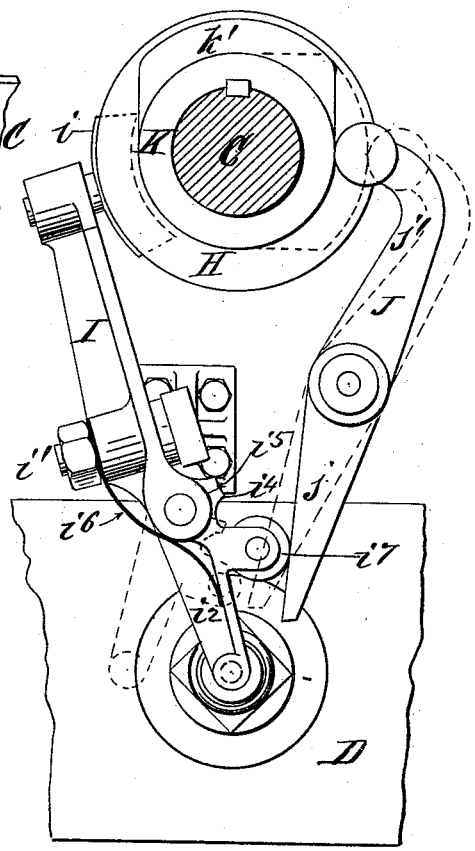
Figure 20:
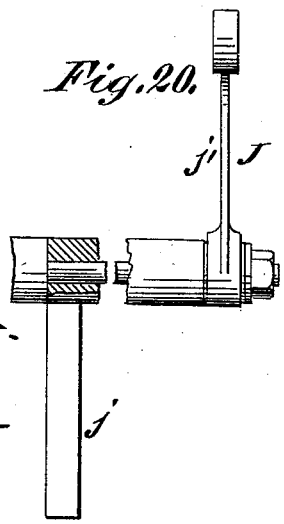
Figure 21:
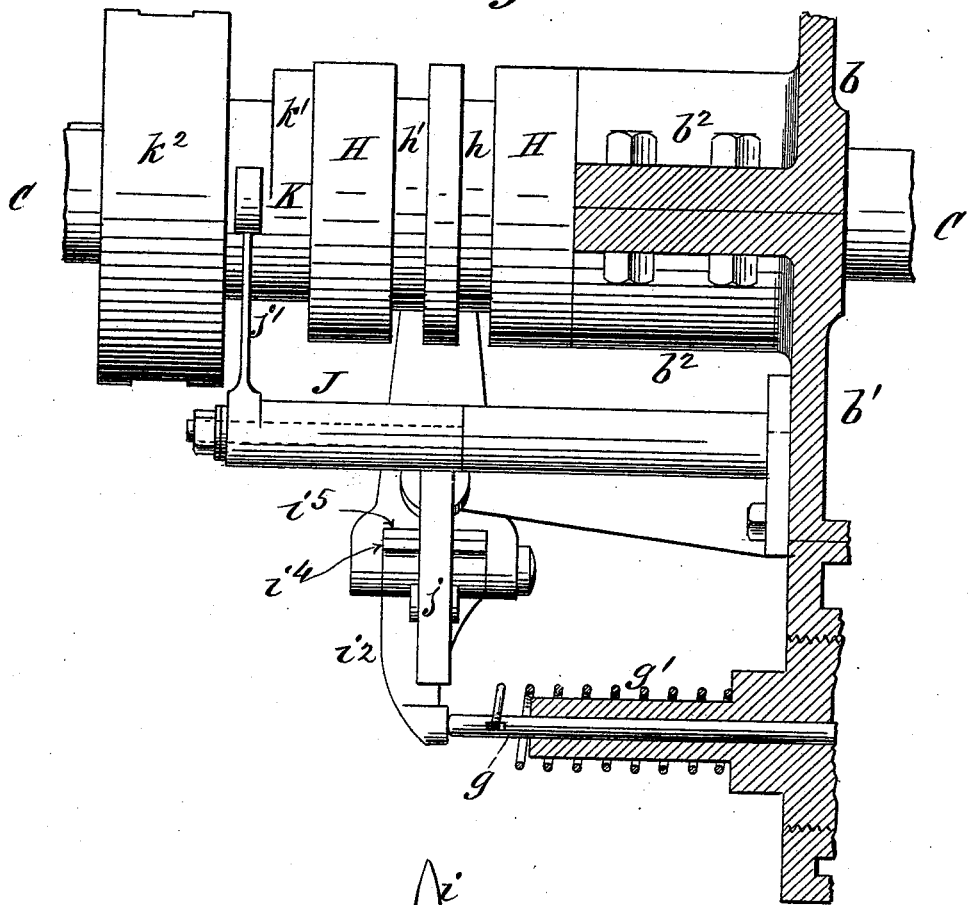
Figure 22:
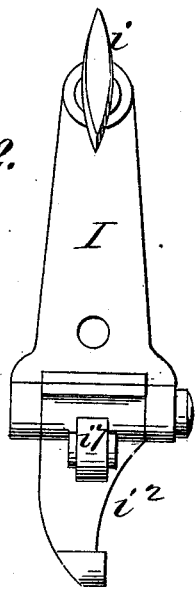

In the accompanying drawings, Figure 1, is a front elevation of my improved motor; Fig. 2, a plan of the same. Fig. 3, is a rear elevation, the fly wheel being omitted; Fig. 4, a horizontal section, partly in elevation; Fig. 5, a central vertical section taken upon plane of line $u$, $u$, Fig. 4, the cranks being shown in elevation. Fig. 6, is an end elevation; Fig. 7, a central vertical section, partly in elevation; Fig. 8, a vertical section upon plane of line $v$, $v$, Fig. 5; Fig. 9, a vertical section upon plane of line $w$, $w$, Fig. 5; Fig. 10, a plan of the under side of the motor. Fig. 11, is a horizontal section upon plane of line $x$, $x$, Fig. 3, taken from the under side of the motor. Fig. 12, is an elevation of the under side of a portion of one of the cylinders, showing the inlet and water ports. Fig. 13, is a view of the upper side of the outer end of a conduit. Fig. 14, is a rear view of the engine. Fig. 15, is a view of the inner side of the fly wheel. Fig. 16, is a transverse section upon plane of line $y, y$, Fig. 3. Fig. 17, is an elevation of the inner side of one of the cylinder heads removed. Fig. 18, is an enlarged view showing the exhaust cam lever, &c.; Fig. 19, a similar view at right angles to Fig. 18; Fig. 20, a detail of the governor-cam lever; Fig. 21, a detail view of the cams, &c., taken from the side opposite to that shown in Fig. 18. Fig. 22, is an elevation of the exhaust cam lever detached. Fig. 23, is a sectional elevation through the fly wheel, governor and exhaust cam. Fig. 24, is a diagram illustrating the condition of the gas charge through the successive revolutions of the crank shaft. Fig. 25, is a view illustrating the use of my engine as a motor for vessels, its position below the water line, &c.

The opposed power cylinders A, A', are secured at their inner ends to a central trunk or box B, in which the cranks $c, c'$, of the shaft C, work. This box B, is made in two parts $b, b'$, with the bearings $b^2$, for the shaft C. Below the trunk B, is the valve chest D, connected by the conduits $d, d'$, with the outer ends of the cylinders A, A'.

The trunk pistons E, E', are connected by swinging piston rods $e, e'$, directly to the cranks $c, c'$, upon the power shaft C; and the stroke is such that they travel outward as far as the ports $a, a'$, which open into the cylinders A, A', close to the heads $a^2, a^3$, of the latter, so that the outer faces of the pistons E, E', are separated from the inner surface of the heads $a^2, a^3$, but slightly at the end of the outward stroke, there being no special provision of compression spaces within the cylinders as in other forms of gas engines. Hence the length of the cylinders A, A', may be considerably reduced,—the compression of the gases taking place mainly in the passages $d^2$, $d^3$, which connect the ports $a, a'$, with the central chamber $d^4$, into which the supply valve F, and exhaust valve G, open,—said central chamber $d^4$, also affording space for the compression of the gases during the outward stroke of the pistons E, E'. This compression of the charge takes place during the last half of the first revolution.

By reference to Fig. 24, in which the circles represent two succeeding revolutions of the power shaft, it will be seen that during the first half of the first revolution the charge of gas is drawn in, compressed during the second half, fired during the first half of the second revolution, and discharged during the second half, and so on continuously. This is effected through the medium of the cam H, on the shaft C, said cam operating the discharge valve G, through the medium of the rock lever I. The cam H, is formed with two peripheral grooves $h, h'$, which converge, and cross each other, as it were, at $h^2$, so that the traveler $i$, traverses first one and then the other of the grooves $h, h'$, being shunted from one to the other by the side walls of the grooves themselves in the well known manner of the endless screw worm and traveler.

When the pivoted traveler $i$, enters and traverses the groove $h'$, it rocks the lever I, upon its fulcrum $i'$, causing the lower end $i^2$ of said lever I to press the valve stem $g$, inward against the resistance of the spring $g'$. When the traveler $i$, enters the inner groove $h$, the lever is rocked in the opposite direction, allowing the spring $g'$, to close the valve G.

The lower end $i^2$, of the rock lever I is pivotally connected to the said lever I, as illustrated clearly in Figs. 18, 19 and 22. The section $i^2$, is formed with a shoulder $i^4$ which is held normally against a stop $i^5$, on the lever I, by a spring $i^6$. It is also provided with a bearing roller $i^7$, which rests against the face of the lower arm $j$, of the bell crank lever J. The upper arm $j'$, of the latter rests against the governor or relief cam K which is feathered to the shaft C. When the eccentric portion $k'$, of the cam K, rocks the upper arm $j'$, of the bell crank lever J, backward, the lower arm $j$, presses the lower section $i^2$, of the rock lever I, backward against the resistance of the spring $i^6$, as indicated in dotted lines in Fig. 19, thereby releasing the valve stem $g$, from contact with the lever I, when the spring $g'$, will hold the valve G, closed until the lower end $i$, of the lever I is again restored to position.

The relief cam K is so timed with relation to the discharge cam H that its eccentric or throw $k'$, coincides with the portion of the groove $h'$, which effects the opening of the discharge valve G; and the cam K would thus prevent the discharge of the products of combustion continuously were it not that it is held and controlled by the governor L, which normally holds the cam K in such position on the shaft C that its eccentric portion or throw $k'$ is not in alignment with the upper arm of the bell crank lever J.

The governor L is substantially the same construction as that shown and described in my last application hereinbefore referred to excepting that in the present case it is attached directly to the fly wheel M. Its inner arms $l, l$, engage with notches in the sleeve $k^2$, extending backward from the cam K. When the speed of the engine exceeds a prescribed degree the weighted arms $l', l'$, recede against the resistance of the spring $l^2$, rocking the arms $l'$, upon the pivots $l^3, l^3$, and causing them to draw back the cam K until its thrust $k'$, is brought into alignment with the upper arm $j$, of the bell-crank lever J. Should this happen while the thrust section $k'$, is on the side of the arm $j$, the latter yields laterally until the cam has rotated sufficiently to allow it to spring back into position to receive the thrust $k'$. This I accomplish by making the arm $j$, of comparatively thin elastic material, as described in my last named application which shows a similar spring arm and cam.

From the foregoing it will be seen that the cam K acts to close the discharge valve G, only when the speed of the engine throws the governor L into action, so that the action of the discharge cam is not interfered with when the engine is running within the limits of speed.

The charge is drawn in from the supply pipe O, through the puppet valve F, by the suction created by the inward stroke of the pistons. It is exploded by an igniter P, of any desired or suitable form, that shown in the drawings being designed to represent the form of incandescent igniter described in my application, Serial No. 472,494, filed May 1, 1893. When the discharge valve G is opened the products of combustion are forced out through the exhaust pipe Q.

The engine cylinders A, A', heads $a, a'$, valve chest D, and conduits $d, d'$, are formed with water jackets which communicate with each other.

Where the engine is used for marine purposes it is preferably placed below the water line, as indicated in Fig. 25, and the lower part of the water jacket system connected by a supply pipe or pipes R, with the exterior of the hull, while the upper part of the water jacket system is connected by a discharge pipe or pipes S, with the exterior at a higher level. Thus arranged a natural circulation of the cooling liquid may be maintained,—the water as it becomes heated rising and being replaced by cold water entering through the inlet R, and the flow being regulated by valves $s, s$, in the discharge pipes S, S.

What I claim as my invention, and desire to secure by Letters Patent, is—

1. In a gas engine, the combination of two opposed power cylinders having closed outer ends; two trunk pistons in said cylinders connected directly by swinging piston rods to cranks upon a common central shaft; said crank shaft; a common valve chest; two conduits; one connecting the said common valve chest with the outer end of one cylinder, and the other conduit connecting said common valve chamber with the outer end of the other cylinder, said conduits acting as both supply and exhaust passages for the said cylinders respectively; supply and discharge valves opening into said common valve chest; and an igniter communicating with said common valve chest; substantially in the manner and for the purposes described.

2. In a gas engine, the combination of two opposed power cylinders having closed outer ends; a central trunk connecting the inner ends of said cylinders; two trunk pistons in said cylinders connected directly by swinging piston rods to cranks upon a common central shaft; said crank shaft; a common valve chest; two conduits, one connecting the said common valve chest with the outer end of one cylinder, and the other conduit connecting said common valve chamber with the outer end of the other cylinder, said conduits acting as both supply and exhaust passages for the said cylinders respectively; supply and discharge valves opening into said common valve chest; and an igniter communicating with said common valve chest substantially in the manner and for the purposes described.

3. In a gas engine, the combination of two opposed power cylinders having closed outer ends, two trunk pistons in said cylinders connected directly by swinging piston rods to cranks upon a common shaft, said crank shaft, a cam upon said crank shaft, a rock lever connecting said cam with the discharge valve, and said discharge valve opening into a passage communicating with the outer ends of both cylinders, substantially in the manner and for the purpose described.

4. In a gas engine, the combination of two opposed cylinders having closed outer ends, two trunk pistons in said cylinders connected directly by swinging piston rods to cranks upon a common shaft, said crank shaft, a fly wheel on said crank shaft, a centrifugal governor on said fly wheel, a cam on said crank shaft controlled by said governor, mechanism operated by said cam to release the discharge valve, and said discharge valve opening into a passage communicating with the outer ends of both cylinders in the manner and for the purpose described.

5. In a gas engine, the combination of two opposed cylinders having closed outer ends, two trunk pistons in said cylinders connected directly by swinging piston rods to cranks upon a common shaft, said crank shaft, a centrifugal governor on said crank shaft, a cam on said crank shaft controlled by said governor, a bell crank operated by said cam to trip the mechanism for opening the discharge valve, and said discharge valve opening into a passage communicating with the outer ends of both cylinders, substantially in the manner and for the purpose described.

6. In a gas engine, substantially such as described, the combination of the cam H on the crank shaft, the rock-lever I, formed with the pivoted lower end $i^2$, the valve G, rod $g$, the bell crank lever J, and the centrifugal governor L, the whole arranged and operating substantially in the manner and for the purpose described.

FEODOR HIRSCH.

Witnesses:
GEORGE WILLIAM MIATT,
D. W. GARDNER.